(12) United States Patent
Büssert

(10) Patent No.: US 7,627,119 B2
(45) Date of Patent: Dec. 1, 2009

(54) ENCRYPTION OF CONTROL PROGRAMS

(75) Inventor: Jürgen Büssert, Igensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1581 days.

(21) Appl. No.: 10/056,905

(22) Filed: Nov. 13, 2001

(65) Prior Publication Data

US 2002/0116623 A1 Aug. 22, 2002

(30) Foreign Application Priority Data

| Dec. 15, 2000 | (DE) | ................................ | 100 62 741 |
| Dec. 18, 2000 | (DE) | ................................ | 100 63 059 |
| Dec. 21, 2000 | (DE) | ................................ | 100 64 400 |
| Mar. 23, 2001 | (DE) | ................................ | 101 25 386 |
| May 23, 2001 | (DE) | ................................ | 101 25 383 |
| Aug. 6, 2001 | (DE) | ................................ | 101 38 533 |

(51) Int. Cl.
*H04N 7/167* (2006.01)

(52) U.S. Cl. ........................ 380/239; 713/150; 713/189; 713/191

(58) Field of Classification Search ................... 380/28, 380/29, 30, 239; 713/187, 189, 191, 200; 705/51

See application file for complete search history.

(56) References Cited

U.S. PATENT DOCUMENTS

| 4,281,379 | A | | 7/1981 | Austin | ........................ | 364/102 |
| 5,978,476 | A | * | 11/1999 | Redman et al. | ................ | 705/51 |
| 6,006,190 | A | | 12/1999 | Baena-Arnaiz et al. | ......... | 705/1 |
| 6,099,317 | A | | 8/2000 | Bullwinkel et al. | .......... | 434/118 |
| 6,125,363 | A | | 9/2000 | Buzzeo et al. | .............. | 707/100 |
| 6,470,235 | B2 | * | 10/2002 | Kasuga et al. | ................ | 700/246 |
| 6,487,665 | B1 | * | 11/2002 | Andrews et al. | ............. | 713/201 |
| 6,631,512 | B1 | * | 10/2003 | Onyeabor | .................... | 717/100 |
| 6,681,212 | B1 | * | 1/2004 | Zeng | ............................ | 705/51 |
| 6,694,433 | B1 | * | 2/2004 | Kolouch | ................... | 705/36 R |
| 6,697,942 | B1 | * | 2/2004 | L'Heureux et al. | .......... | 713/152 |
| 6,785,825 | B2 | * | 8/2004 | Colvin | ........................ | 726/28 |
| 6,904,527 | B1 | * | 6/2005 | Parlour et al. | ................ | 713/189 |
| 2002/0004804 | A1 | * | 1/2002 | Muenzel | ..................... | 707/513 |

FOREIGN PATENT DOCUMENTS

| CA | 2 283 960 A1 | 4/2000 |
| DE | 198 04 788 A1 | 7/1999 |
| EP | 0 991 225 A2 | 4/2000 |
| EP | 1 031 909 A2 | 8/2000 |
| WO | 0056033 | 9/2000 |

OTHER PUBLICATIONS

Tatsuo Miyazawa et al.'s, "An Advanced Internet XML/EDI Model Based on Secure XML Documents" in Parallel and Distributed Systems: Workshops, Seventh International Conference on 2000, pp. 295-300, Jul. 4-7, 2000.

* cited by examiner

*Primary Examiner*—Kimyen Vu
*Assistant Examiner*—Yogesh Paliwal
(74) *Attorney, Agent, or Firm*—King & Spalding L.L.P.

(57) ABSTRACT

In order to protect control programs against unauthorized analysis and use during transport via public networks, asymmetrical keys are used. Following the compilation of the control program in the engineering system belonging to the supplier, the program is encrypted in a postprocessor and exported into a public web server. The customer loads the encrypted program into his long-term data holder, imports it into his engineering system and can edit it there in order to configure the control system. Only after editing are the encrypted parts of the program decrypted in a preprocessor and forwarded to the compiler.

16 Claims, 1 Drawing Sheet

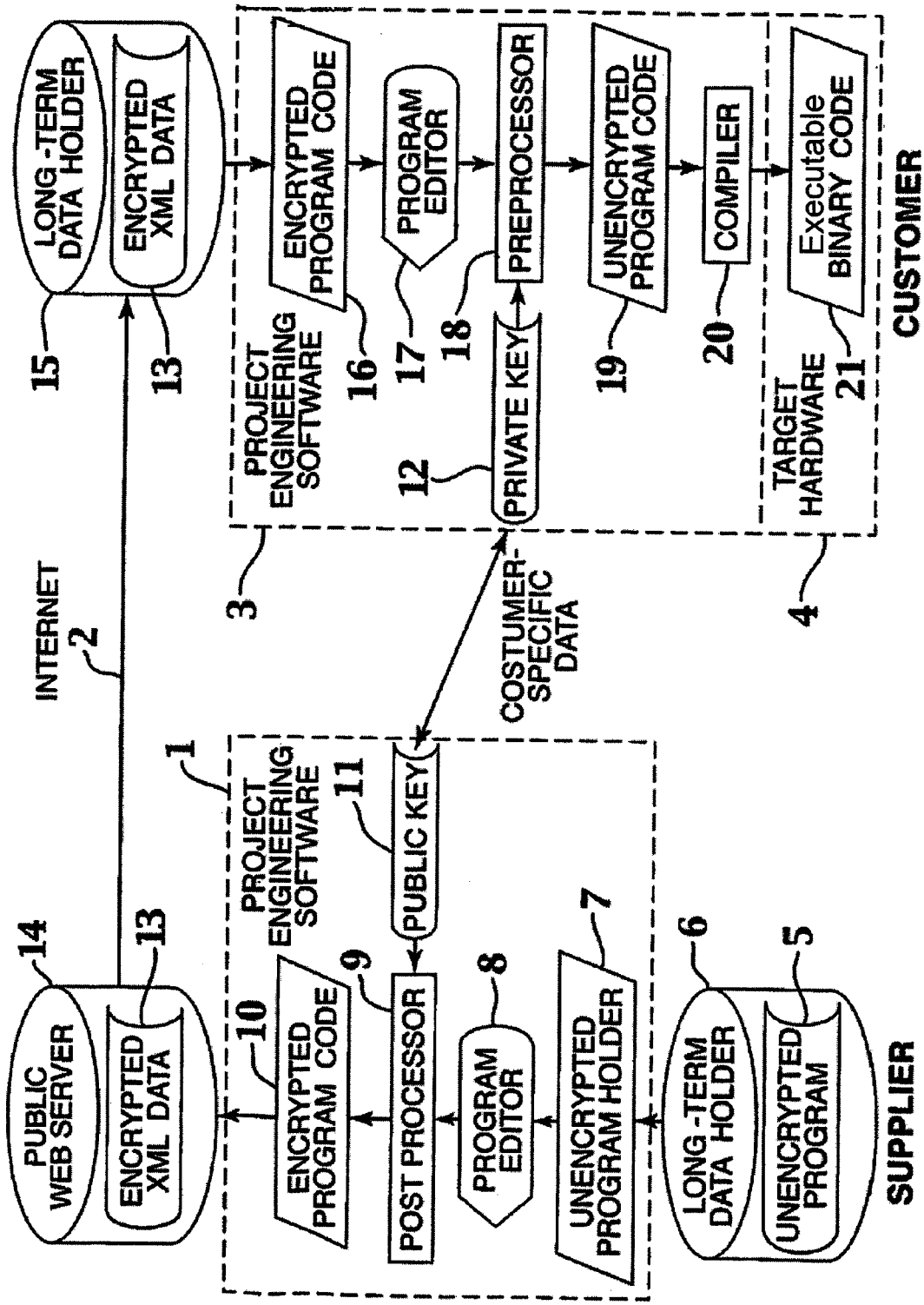

ENCRYPTION OF CONTROL PROGRAMS

CROSS REFERENCE TO RELATED APPLICATION

This application claims priority to German application number 10125383.4 filed May 23, 2001, German application number 10125386.9 filed May 23, 2001, German application number 10138533.1 filed Aug. 6, 2001, German application number 10064400.7 filed Dec. 21, 2000, German application number 10063059.6 filed Dec. 18, 2000, and German application number 10062741.12 filed Dec. 15, 2000.

FIELD OF THE INVENTION

The present invention relates to a method and a system for transferring control programs, particularly in connection with the configuration, project engineering and commissioning of control systems which require the transfer of control programs.

BACKGROUND OF THE INVENTION

The control programs for programmable controllers are generally compiled in development or engineering systems. In addition to compiling control programs, engineering systems are also used for the commissioning, project engineering and configuration of controllers and drives.

It is quite usual for the compilation of the control programs to be carried out by a first specialist team and the commissioning, project engineering and configuration to be carried out by a second specialist team, with the two specialist teams being separated physically from each other. This means that the control program compiled by the first specialist team has to be transmitted to the second specialist team. It is often desirable to be able to use a quick transmission route but without loss of confidentiality during the transmission in order that to ensure that certain knowhow is not accessible to unauthorized third parties.

SUMMARY OF THE INVENTION

The object of the present invention is therefore to provide a method and a system which enables the transfer of control programs quickly but without losing confidentiality. This objective is achieved by a method of transferring control programs by encrypting a control program code in a first development system, transferring the encrypted control program code from the first development system to a second development system and decrypting the encrypted control program code in the second development system. The desired objective is further achieved by a system for transferring control programs, the system having a first development device for developing a control program code. This device comprises an encryption unit for encrypting the control program code, a communications device for transferring the encrypted control program code from the first development device to a second development device. The second development device comprises a decryption device for decrypting the encrypted control program code. The present invention makes it possible to protect the knowhow on which the control program is based without compromising the speed required to transfer the control program.

BRIEF DESCRIPTION OF THE DRAWING

The present invention is explained in greater detail below with reference to the drawing in which FIG. 1 illustrates a data flow chart according to a preferred embodiment of the present invention.

DETAILED DESCRIPTION OF THE INVENTION

The compiler and supplier of a control program develop the program in project engineering software or engineering system 1. The customer receives this control program via the Internet 2 or any other desired network or other connection. The customer integrates the control program received into his engineering system 3 and can therefore drive his target hardware (run-time system) 4.

In order that the control program is not accessible in all its details during the transmission in public networks to the customer, the control program is wholly or partially encrypted. This may be carried out by means of standardized encryption techniques, for example the PGP method using symmetrical or asymmetrical keys.

More specifically, the supplier first compiles an unencrypted control program 5 and stores it in a long-term data holder 6. The unencrypted program 5 or program code 7 can be loaded by the supplier 6 into a program editor 8 which is part of the engineering system 1. In the editor 8, the supplier can edit the program and, in order to encrypt the program, can start up a postprocessor 9, which outputs an encrypted program code 10. For the purpose of encryption, the postprocessor 9 uses a key 11. The standardized PGP method is typically used for encryption. In the case of asymmetrical encryption, the supplier uses a "public key" for the encryption, and the customer uses the matching "private key" 12 for the decryption.

In order to transmit the encrypted program code 10, for example via the Internet 2, the data is initially exported from the project engineering software 1. Here, the data is preferably converted into HTML or XML format, or another format that can be read by standard Internet clients. The advantage of data formatted in this way resides in the fact that access to the data can be obtained with standard tools, and the user does not necessarily have to have an engineering system. After export, the encrypted XML data 13 is stored, for example, in a public web server 14 which makes the encrypted control program available only to a specific, desired client group, in the XML format for generality or in accordance with the encryption technique.

The customer loads the encrypted XML data 13 into his long-term data holder 15. From the data holder 15, the data is imported into the engineering system or the project engineering software 3 belonging to the customer. If the engineering system 3 of the customer is not based on the XML format or another format that can be read by standard Internet clients, conversion of the data into the engineering system format takes place during the import, the corresponding, encrypted program code 16 being generated. The customer is then able to edit the encrypted program code 16 in his program editor 17, which is again part of the engineering system 3.

Depending on the depth of encryption, the customer is in a position to edit only the data desired by the supplier. For example, it is possible to encrypt the data to any desired depth in the horizontal and vertical direction. Encryption on a specific horizontal plane means that, for example, modules at the same functional level are encrypted differently. For example, a library having the functions a, b, c and d may be encrypted with a number of pairs of keys so that the customers A, B, C and D can decrypt and use only the modules intended for them in each case. Vertical encryption means different encryption at different hierarchical, functional levels. For example, it is conceivable that a customer merely has to know the module parameters, including the return parameters, in order to operate the control program. The head of the control program can therefore remain unencrypted, while the core of the program is encrypted. This is used in particular for the purpose of protecting the knowhow on which the software is based. Furthermore, the software program can also be completely encrypted for the purpose of transmission and processing by the customer and, for example, only capable of being decrypted completely by the service personnel. Further, arbitrary granular types of encryption are also conceivable which correspond to the modular construction of a control program.

Following editing, the wholly or partly encrypted control program is decrypted in a preprocessor 18 belonging to the engineering system 3. For this purpose, the preprocessor 18 uses the private key 12. The decrypted program code 19 obtained from the preprocessor 18 is converted in a compiler 20 into microprocessor-specific, executable binary code 21, which is then loaded by the project engineering software or the engineering system 3 into the target hardware or a runtime system 4. There, the binary code is processed by a microprocessor.

The aforementioned integration of an encryption system into engineering systems, using asymmetrical keys 11, 12, results in the following advantages:

- The known routines for encryption and decryption convert from ASCII text into ASCII text. The encrypted areas may therefore be saved and transported in the same way as the unencrypted areas, and therefore provide ideal integration into the widespread XML format. In particular, standard tools may be used for the further processing of the data.
- Because of the use of a text format, it is also possible for parts of a text to be encrypted. Therefore, as already mentioned, the head of a program with Defines, as they are known, for adaptation can remain unencrypted, while the body of the program having the functions is protected.
- The supplier of user software, for example compiler or project engineering tool, provides its own pair of keys. In the case of asymmetrical encryption, the supplier keeps the public key with the customer data of the user. Therefore, the supplier can, for example, encrypt libraries for specific customers by using their public key and transmit them to these customers via any desired channel. Accordingly, copying the user software provided via public channels is senseless since the library can be decrypted only for the application of the envisaged customer. Hence, a license system can easily be implemented.
- The encrypted texts cannot be analyzed. The internal knowhow therefore remains protected.
- As a result of the integration of asymmetrical decryption into a preprocessor belonging to the compiler, parts of the program can be protected against misuse without changing the compiler itself. The preprocessor runs only during the generation of the binary code for the target system. Furthermore, the program editor also does not require any change, since the encrypted texts are displayed as such.

The system according to the present invention described above may be modified with the effect that the encryption is incorporated directly into the export mechanism and the decryption is incorporated directly into the import mechanism. However, all the data from the control program will be released to the customer for editing.

I claim:

1. A method for transferring control programs comprising encrypting only a part of a control program code in a first development system,
transferring the encrypted control program code from the first development system to a second development system, and
decrypting the encrypted control program code in the second development system, wherein the decryption of the partially encrypted control program code is carried out following editing of the partially encrypted control program code in the second development system.

2. The method according to claim 1, further comprising exporting the encrypted control program code in a format that can be read by standard Internet clients via the first development system, and importing a data in the format that can be read by standard Internet clients via the second development system.

3. The method according to claim 1, wherein the encryption and decryption of the data is carried out by means of asymmetrical keys.

4. The method according to claim 1, wherein the encryption of the control program code is carried out following editing of the control program code in the first development system.

5. The method according to claim 1, wherein a head of the control program remains unencrypted.

6. The method according to claim 1, wherein the control program comprises a plurality of program modules and wherein different modules are encrypted differently.

7. A method according to claim 6, wherein a head part of the control program remains unencrypted.

8. The system according to claim 6, wherein different modules are encrypted with different encryption levels.

9. A method for the configuration, project engineering and commissioning of a control system and a drive comprising transferring a control program according to claim 1, comprising compiling the decrypted control program, and processing the compiled control program by means of a microprocessor.

10. A system for transferring control programs, comprising a first development device for developing a control program code, said first device comprising an encryption unit for encrypting only a part of the control program code, and a communication device for transferring the partially encrypted control program code from the first development device to a second development device, wherein said second development device comprises an import device for importing the partially encrypted control program code and an editor for editing the control program which is connected between a decryption device for decrypting the partially encrypted control program code and the communication device.

11. The system according to claim 10, wherein the first development device further comprises an export device for exporting the encrypted control program code in a format that can be read by standard Internet clients, and the second development device further comprises an import device for importing the data in the format that can be read by standard Internet clients.

12. The system according to claim 10, wherein the encryption and decryption of the data are carried out by means of asymmetrical keys.

13. The system according to claim 10, wherein the first development device further comprises a second editor for editing the control program code and a communication device and a postprocessor for partially encrypting the control program code connected between said second editor and communication device.

14. The system according to claim 10, wherein the control program comprises a plurality of program modules and wherein different modules are encrypted different.

15. The system according to claim 14, wherein different modules are encrypted with different encryption levels.

16. The system according to claim 10 utilized in an arrangement for the configuration, project engineering and commissioning of a control system and/or a drive.

* * * * *